March 24, 1964 B. S. SAUTER 3,125,922
PUSH FASTENER WITH INWARDLY DIRECTED LIMITING MEANS
Filed Sept. 18, 1961
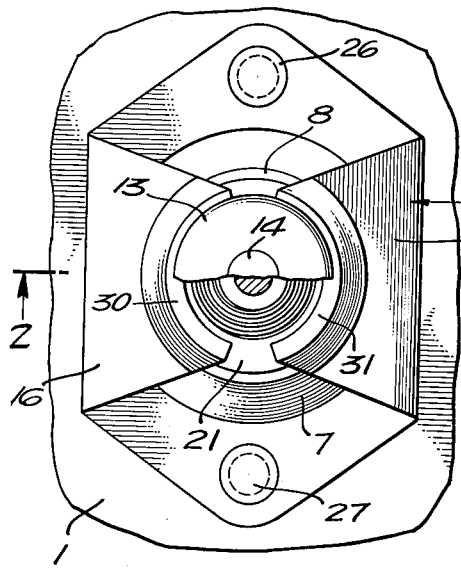
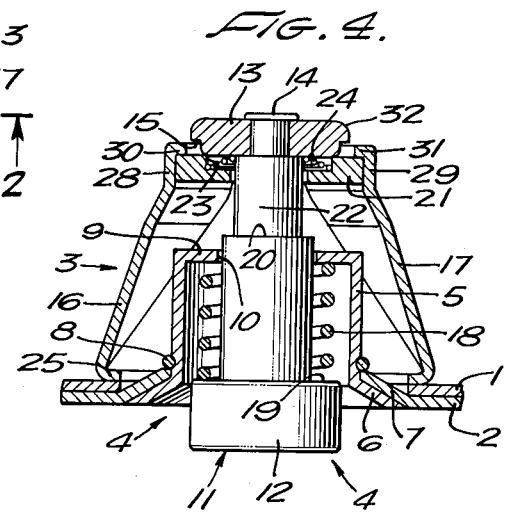
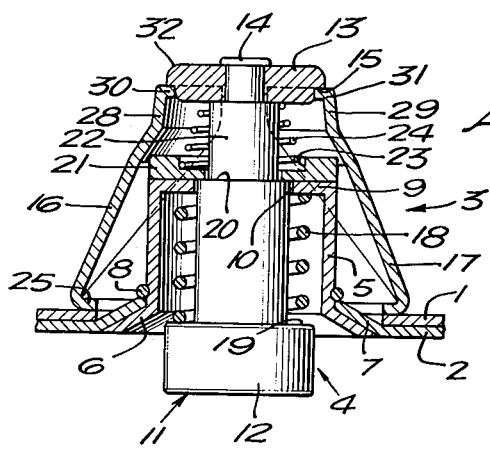
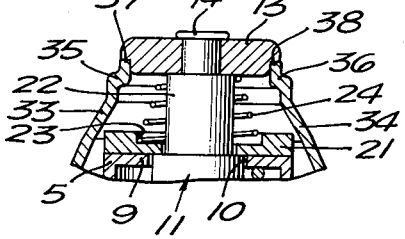
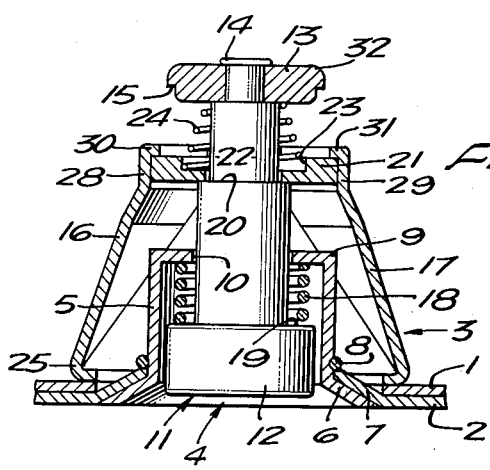
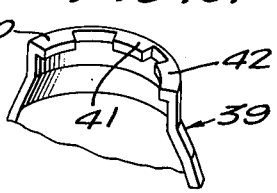
INVENTOR.
BOBBIE S. SAUTER
BY
ATTORNEY United States Patent Office 3,125,922
Patented Mar. 24, 1964

3,125,922
PUSH FASTENER WITH INWARDLY DIRECTED
LIMITING MEANS
Bobbie S. Sauter, Woodland Hills, Calif., assignor to
Deutsch Fastener Corp., Los Angeles, Calif., a corporation of California
Filed Sept. 18, 1961, Ser. No. 138,995
9 Claims. (Cl. 85—5)

This invention pertains to a fastener that is both secured and released by axial movement of a plunger. In particular, this invention relates to a push fastener having an improved retainer arrangement for assuring trouble-free operation.

A fastener of the general type provided by this invention is illustrated in U.S. Patent 2,995,969. This type of fastener includes a plunger having a shoulder at one end that is engaged and retained by inwardly directed spring prong elements. These prongs are secured to one of the members to be secured, while the plunger is carried by a receptacle in the other member to be fastened and biased outwardly by a spring. The plunger includes a second shoulder that is engageable with a release element in the form of a disc slidable on the plunger between the two shoulders. Inward movement of the plunger, therefore, moves the release disc outwardly to engage the spring prong elements, forcing them away from the plunger so that the plunger is no longer held thereby. The releasing member is frictionally retained by the spring prongs until the plunger is moved outwardly by the spring to a released position.

While in general this is a very satisfactory type of quick release easily operated fastener, there have been in some instances difficulties arising from the inward movement of the release member. If the plunger pushes the release member inwardly too far, it will pass the ends of the spring prongs instead of merely holding these members in their separated position. When this occurs, the release member then is on the wrong side of the prongs and cannot serve to spread the prongs apart. As a result, the fastener cannot be released.

This invention overcomes this difficulty by providing prong elements having inwardly extending portions at their distal ends which preclude movement of the release member beyond the ends of the prongs. This means that it is impossible for the plunger to shift the release element too far inwardly, and the release member can never pass the ends of the prongs.

Therefore, it is an object of this invention to provide a push-type fastener of improved reliability.

Another object of this invention is to provide a push-type fastener in which the releasing member can never pass the ends of the retainer prongs.

A further object of this invention is to improve the reliability of operation of a push-type fastener without adding to its complexity, expense or weight.

These and other objects will become apparent from the following detailed description taken in connection with the accompanying drawing in which:

FIG. 1 is a top plan view, partially broken away, of the fastener of this invention in its secured position, FIG. 2 is a longitudinal sectional view taken along line 2—2 of FIG. 1, FIG. 3 is a sectional view similar to FIG. 2 showing the plunger in its inner position with the release collar prevented from passing the ends of the spring prongs by the inwardly extending tips on these retainer elements, FIG. 4 is a sectional view similar to FIGS. 2 and 3 but with the plunger moved outwardly toward the released position, FIG. 5 is a fragmentary sectional view similar to FIG. 2 showing a modified form of lip on the retainer members, and FIG. 6 is a fragmentary perspective view of a modified end portion of a retainer member having a lip that is not continuous.

With reference to the drawing, the fastener of this invention is illustrated as connecting two sheet metal members 1 and 2, although it is applicable for securing other members as desired. The fastener is made up of a retainer assembly 3 and a plunger assembly 4. The latter unit may include a cup-shaped receptacle 5, which acts as a support member for the plunger assembly, received within an opening in member 2 through which it projects. An angular flange 6 engages a correspondingly dimpled portion 7 of the member 2, thereby retaining the receptacle element against movement in one direction. In addition, a suitable means such as a snap ring 8 further secures the receptacle member to the member 2 to be fastened.

The inner end wall 9 of the receptacle is provided with a central opening 10 through which a plunger 11 extends. The plunger is axially movable with respect to the receptacle and includes a head 12 at one end for use in manually operating the plunger. A disc 13 is included at the opposite end of the plunger, and may be integral with the plunger or formed as a separate element, as illustrated. The disc may be secured to the plunger by an upset 14. A radial shoulder 15 on the disc 13 engages the ends of leaf spring elements 16 and 17 of the retainer assembly 3 when the fastener is in the secured position of FIGS. 1 and 2. This holds the plunger against the force of coil spring 18 which biases the plunger downwardly from the position of FIG. 2. This spring bears at one end against the inner surface of wall 9 of the receptacle 5, and at the opposite end contacts shoulder 19 of the head 12 of the plunger.

An additional shoulder 20 is provided on the plunger intermediate the end disc 13 and shoulder 19. The shoulder 20 is engageable with a releasing disc 21 which is an annular member slidably receiving the portion 22 of the plunger between the end disc 13 and the shoulder 20. The disc 21 may include a central recess 23 that receives one end of a light coil spring 24. The other end of spring 24 bears against the inner surface of the end disc 13 so that the spring 24 serves to urge the release disc 21 into a position of engagement with end wall 9 of the receptacle, as illustrated in FIG. 2.

The retainer assembly 3 may be of one piece construction and includes a base 25 suitably secured to member 1 by means of rivets 26 and 27, or other suitable means. The retainer members 16 and 17 incline outwardly from the base 25 on opposite sides of the plunger 11. The outer portions 28 and 29 of the retainer elements 16 and 17 make a more shallow angle with respect to the axis of plunger 11 than do the adjacent portions of these members.

At the outer edges of the retainer members there are provided inwardly directed lips 30 and 31. These lips are contoured to be substantially complementary to the wall of the disc 13 adjacent the shoulder 15. The shoulder 15 contacts the outer faces of these lips in holding the fastener in its assembled position. The retainer elements 16 and 17 are of leaf spring construction so that they are biased inwardly toward the plunger and will bear against the end disc as illustrated when the fastener is in its secured position.

In order to effect release of the fastener of this invention, the plunger 11 is moved inwardly by pressing on head 12 to shift the plunger to the position of FIG. 3. When this occurs, the release disc 21 is forced upwardly by the shoulder 20, engaging the retainer elements 16 and 17. The release disc then is brought into contact with the end portions 28 and 29 of the retainer elements, holding the retainers in a separated position. The portions 28 and 29 frictionally grip the retainer disc so that upon release of the plunger 11 the spring 18 moves the plunger downwardly, as indicated in FIG. 4. The release disc 21 is dimensioned to hold the retainer elements 16 and 17 separated sufficiently so that the end disc 13 then can pass the inner edges of the lips 30 and 31 on the ends of the retainers. This releases the fastener so that the members 1 and 2 can be separated.

Of course, the spring 18 exerts considerably more force than the light spring 23 which is collapsed into the recess 22 as the fastener is separated. When the end disc 13 moves inwardly toward the receptacle 5, it contacts the releasing disc 21. There the force of spring 18 causes end disc 13 to slide the release member 21 out of engagement with the retaining members 16 and 17.

The fastener is secured in a similar manner simply by forcing the disc 13 upwardly through the end wall of the receptacle to a point where the shoulder 15 passes over the lips 30 and 31 and again assumes the retained position. The rounded outer edge 32 of the disc 13 permits this member to move past the inwardly directed lips 30 and 31 as the plunger is moved to the secured position. If desired, a straight bevel could be provided on the end disc to serve the same purpose.

An important aspect of this invention is found in the use of the lips 30 and 31 at the ends of the retaining elements 16 and 17. These lips assure that the releasing disc 21 can never pass beyond the ends of the retainers. Thus, as seen in FIG. 3, despite the fact that the plunger has pushed the releasing disc upwardly toward the ends of the retaining elements, the lips 30 and 31 have engaged the outer wall of the releasing disc to preclude its further travel outwardly. Unlike the rounded outer edge 32 of the end disc 13 of the plunger, the releasing member is devised to abut the inner edges of the lips which form a detent precluding further movement of the releasing member. Therefore, regardless of the fact that the plunger has considerable free movement to allow the unit to be associated with workpieces of various thicknesses, the releasing member will never inadvertently be pushed too far and thereby preclude separation of the fastener. Without the provision of the lips 30 and 31 it would be possible to push the releasing disc sufficiently to cause the inner radial wall of this member to pass the ends of the releasing elements, which thereupon would spring inwardly and present subsequent outward movement of the releasing disc or the plunger. This difficulty is entirely obviated by the design of this invention.

A modified form of the retaining members may be seen in the fragmentary illustration of FIG. 5. Here retaining elements 33 and 34 include inwardly offset sections 35 and 36 beyond which they extend to provide outer edge surfaces 37 and 38 complementary to the shoulder 15 of the end disc 13. In this arrangement, therefore, instead of contacting the radial walls of inwardly directed lips, the end disc bears against the actual outer edge surfaces of the retaining members. The offsets 35 and 36 provide shoulders that preclude outward movement of the releasing disc 21, functioning similarly to the lips 30 and 31 of the previously described embodiment.

Particularly advantageous from a production standpoint is the retainer design of FIG. 6. Here instead of a unitary shoulder as in the previously described constructions, retainer member 39 includes three spaced tabs 40, 41 and 42. These function as before in preventing the release collar from passing the ends of the retainers. However, by not being continuous along the end of the retainer the tabs are more easily bent over in forming the abutment to limit the travel of the releasing collar. The number of such tabs or their precise shape is not critical.

It can be seen by the foregoing, therefore, that by a variation in form of the retaining elements of the push-type fastener it is possible to prevent any malfunctioning of the device resulting from excessive axial travel of the releasing disc. This construction of the retaining elements is readily effected without in any significant sense adding to the cost or complexity of the fastener unit as a whole.

The foregoing detailed description is to be clearly understood as given by way of illustration and example only, the spirit and scope of this invention being limited solely by the appended claims.

I claim:

1. A fastener comprising a support member, a plunger reciprocative relative to said support member, a first shoulder means at one end of said plunger, a second shoulder means inwardly of said end, a retainer, said retainer including leaf spring means having an end portion inwardly biased against said first shoulder means for retaining said plunger against movement in one direction, resilient means urging the plunger in said one direction, and a release member movable relative to said plunger between said first and second shoulder means, said release member being movable by said second shoulder means in response to movement of said plunger in the opposite direction to a position of engagement with said leaf spring remote from said plunger, said leaf spring means frictionally retaining said release member for permitting said resilient means to move said plunger in said one direction for releasing said plunger from said retainer, said leaf spring means having abutment means limiting the amount of said movement of said release member for preventing said release member from moving beyond said end portion of said leaf spring means.

2. A device as recited in claim 1 in which said abutment means of each leaf spring element is spaced inwardly from the outer edge thereof, said outer edge engaging said first shoulder means.

3. A fastener comprising a support member adapted to be attached to a member to be fastened; a plunger axially movable with respect to said support member, said plunger having a first shoulder means at one end thereof and a second shoulder means inwardly of said end; a release member slidably carried by said plunger between said shoulder means; a retainer adapted to be attached to another member to be fastened, said retainer including a plurality of leaf spring elements inwardly biased against said plunger at said first shoulder means; and resilient means urging said plunger axially in one direction, said leaf spring elements precluding such movement, said second shoulder means moving said release member to a position of engagement with said leaf spring elements in response to movement of said plunger in the opposite direction, said release member being dimensioned to force said leaf spring elements to a position where they are remote from said plunger and be frictionally gripped by said leaf spring elements for maintaining said leaf spring elements in such position, said leaf spring elements having abutment means for limiting the amount of movement of said release member.

4. A device as recited in claim 3 in which said abutment means comprises a lip means on the distal end portion of each of said leaf spring elements, said lip means projecting inwardly toward said plunger substantially at right angles to the axis of said plunger.

5. A device as recited in claim 3 in which the edge of said plunger at said one end axially outwardly of said first shoulder means is convergent axially outwardly of said plunger for permitting said plunger to pass said abutment means when moved in said opposite direction to a secured position.

6. A device for securing together a plurality of members to be fastened, said members having alignable apertures therethrough, said device comprising a support member adapted to be secured to one of said members to be fastened and extend through an aperture therein; a plunger reciprocative relative to said support member, said plunger having a first shoulder means on the outer end thereof, and a second shoulder means inwardly of said first shoulder means; a disc member slidably received on said plunger intermediate said shoulder means; resilient means urging said plunger in one direction with respect to said support member, and a retaining member, said retaining member including a plurality of leaf spring elements adjacent said plunger, said leaf spring elements having distal end portions engaging said first shoulder means for precluding movement of said plunger by said resilient means, said disc member being movable by said second shoulder means of said plunger in response to movement of said plunger in the opposite direction in opposition to said resilient means for shifting said release member into engagement with said leaf spring members adjacent said ends thereof, said release member being dimensioned to separate said leaf spring members upon such movement and arranged so that said leaf spring members frictionally retain said release member for thereby permitting said plunger to move in the opposite direction in response to the force of said resilient means and allowing said first shoulder to pass said ends of said retaining members for thereby releasing said fastener, said leaf spring members including an inwardly directed portion adjacent said ends thereof for precluding movement of said release member to a position whereby said release member is shifted beyond said ends of said leaf spring members.

7. A device as recited in claim 6 in which said inwardly directed portions of said leaf spring members comprise an inwardly bent lip at the end of each of said leaf spring members, said disc member having a substantially radial surface adjacent said lips, said lips being substantially complementarily engageable with said radial surface.

8. A device as recited in claim 6 in which said inwardly directed portions of said leaf spring members comprise inwardly bent surfaces spaced inwardly from the outer edges of said leaf spring members.

9. A device as recited in claim 6 in which the end of said plunger adjacent said first shoulder means is inclined outwardly at the periphery thereof for allowing said end to pass said inwardly directed portions of said leaf spring members for thereby permitting said plunger to move to a secured position.

References Cited in the file of this patent

UNITED STATES PATENTS

| | | |
|---|---|---|
| 2,941,270 | Long | June 21, 1960 |
| 2,995,969 | Kraus | Aug. 15, 1961 |